United States Patent
Schmalstieg et al.

(10) Patent No.: US 6,545,087 B1
(45) Date of Patent: Apr. 8, 2003

(54) POLYURETHANE PREPOLYMERS HAVING ALKOXYSILANE END GROUPS, METHOD FOR THE PRODUCTION THEREOF AND THEIR USE FOR THE PRODUCTION OF SEALANTS

(75) Inventors: Lutz Schmalstieg, Köln (DE); Ralf Lemmerz, Leverkusen (DE); Marie-Helene Walter, Langenfeld (DE); Oswald Wilmes, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/830,307

(22) PCT Filed: Oct. 18, 1999

(86) PCT No.: PCT/EP99/07883

§ 371 (c)(1),
(2), (4) Date: Apr. 25, 2001

(87) PCT Pub. No.: WO00/26271

PCT Pub. Date: May 11, 2000

(30) Foreign Application Priority Data

Oct. 29, 1998 (DE) .......................................... 198 49 817

(51) Int. Cl.[7] .............................................. C08G 77/26
(52) U.S. Cl. ............................. 525/38; 528/26; 528/25; 528/28; 528/59; 528/65; 528/38; 556/413; 556/414; 556/418; 525/453
(58) Field of Search ............................... 528/38, 26, 25, 528/28, 59, 41, 65; 556/413, 414, 418; 525/453

(56) References Cited

U.S. PATENT DOCUMENTS

| | | | |
|---|---|---|---|
| 4,645,816 A | | 2/1987 | Pohl et al. ..................... 528/28 |
| 5,364,955 A | | 11/1994 | Zwiener et al. ............. 556/418 |
| 5,756,751 A | * | 5/1998 | Schmalstieg et al. |
| 6,001,946 A | * | 12/1999 | Waldman et al. |
| 6,265,517 B1 | * | 7/2001 | Stuart .......................... 528/28 |

FOREIGN PATENT DOCUMENTS

| | | |
|---|---|---|
| EP | 0 372 561 | 6/1990 |
| EP | 0 676 403 | 10/1995 |
| EP | 0 831 108 | 3/1998 |

\* cited by examiner

*Primary Examiner*—Robert Dawson
*Assistant Examiner*—Kuo-Liang Peng
(74) *Attorney, Agent, or Firm*—Joseph C. Gil; Thomas W. Roy; Aron Preis

(57) ABSTRACT

This invention relates to polyurethane prepolymers which comprise alkoxysilane terminal groups and which are based on special, very high molecular weight polyurethane prepolymers, to a method of producing them and to their use as binders for low-modulus sealing materials.

7 Claims, No Drawings

POLYURETHANE PREPOLYMERS HAVING ALKOXYSILANE END GROUPS, METHOD FOR THE PRODUCTION THEREOF AND THEIR USE FOR THE PRODUCTION OF SEALANTS

This invention relates to polyurethane prepolymers which comprise alkoxysilane terminal groups and which are based on special, very high molecular weight polyurethane prepolymers, to a method of producing them and to their use as binders for low-modulus sealing materials.

Alkoxysilane-functional polyurethanes which crosslink via a silane condensation polymerisation reaction have long been known. A review article on this topic is to be found. for example. in "Adhesives Age" 4/1995, pages 30 et seq. (authors: Ta-Min Feng, B. A. Waldmann). Alkoxysilane-terminated, moisture-curing, single-component polyurethane of this type are increasingly being used as flexible coating, sealing and adhesive compositions in the building industry and in the automobile industry. In applications such as these, considerable demands are made on the extensibility and adhesion capacity and on the curing rate. In particular, the level of properties required in the building sector cannot be achieved in its entirety by prior art systems.

EP-A-596 360 describes alkoxysilyl-functional polyurethane prepolymers which are suitable as binders for sealing materials. However, the products which are explicitly described in this patent application are not suitable for the production of flexible, low-modulus sealing materials such as those used in the building sector.

The property profile for sealing materials in the building sector is specified in detail in DIN ISO 11600. The same observation is also applicable as regards the most recently published subsequent patent applications to EP-A 596 360, namely EP-A 831108 and EP-A 807 649. The products described in these prior art patents are suitable for the production of high-modulus sealing materials such as those which are used the engineering field, but are not suitable for the production of low-modulus sealing materials for building.

The object of the present invention was therefore to provide polyurethane prepolymers which comprise alkoxysilane terminal groups and which are suitable as binders for the production of low-modulus sealing materials. It has proved possible to achieve this object by the provision of polyurethane prepolymers which comprise alkoxysilane terminal groups and which are described in detail below: these are based on special, very high molecular weight polyurethane prepolymers.

The present invention relates to polyurethane prepolymers which comprise alkoxysilane terminal groups and which are produced by the reaction of A) linear polyurethane prepolymers, produced by the reaction of
  i) an aromatic, aliphatic or cycloaliphatic diisocyanate component having an NCO content of 20% to 60%. with
  ii) a polyol component which comprises a polyoxyalkylene diol as its main component and which has a molecular weight of 3000 to 20,000, with
B) compounds of formula (I) which comprise alkoxysilane and amino groups

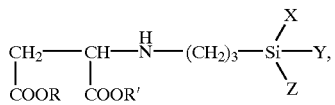

wherein
R and R' represent identical or different alkyl radicals comprising 1 to 8 carbon atoms, preferably 1 to 4 carbon atoms, and
X, Y, Z represent identical or different $C_1$–$C_8$ alkyl or $C_1$–$C_8$ alkoxy radicals comprising 1 to 4 carbon atoms, with the proviso that at least one of the radicals represents a $C_1$–$C_8$ alkoxy group, characterised in that polyurethane prepolymers A) have an average molecular weight from 15,000 to 50,000, preferably from 20,000 to 40,000, as calculated from their NCO content and NCO functionality.

X, Y and Z in formula (I), independently of each other, preferably represent methoxy or ethoxy.

The present invention also relates to a method of producing polyurethane prepolymers comprising alkoxysilane terminal groups by the reaction of A) linear polyurethane prepolymers with an average molecular weight from 15,000 to 50,000 as calculated from their NCO content and NCO functionality, with
B) compounds of formula (I) which comprise alkoxysilane and amino groups

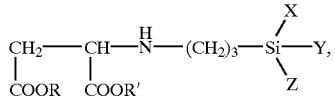

wherein
R and R' represent identical or different alkyl radicals comprising 1 to 8 carbon atoms, preferably 1 to 4 carbon atoms, and
X, Y, Z represent identical or different alkyl or alkoxy radicals comprising 1 to 4 carbon atoms, with the proviso that at least one of the radicals represents an alkoxy group, characterised in that polyurethane prepolymers A) have an average molecular weight from 15,000 to 50,000 as calculated from their NCO content and NCO functionality.

The invention is based on the surprising observation that special polyurethane prepolymers which comprise alkoxysilane terminal groups and which have a very high molecular weight cure to give a tack-free product despite their small number of crosslinking sites, and can be processed to form sealing materials which exhibit good elastomeric properties.

The isocyanate prepolymers A) which are used according to the invention are produced in the manner known in the art from polyurethane chemistry by the reaction of a diisocyanate component i) with a polyol component ii) which is characterised in detail below.

Any prior art aliphatic, cycloaliphatic or aromatic diisocyanates with an isocyanate content of 20 to 60% by weight can be used according to the invention as polyisocyanate component i). The terms "aromatic" and "cycloaliphatic" diisocyanates are to be understood to mean diisocyanates which contain at least one aromatic or cycloaliphatic ring per molecule, wherein, preferably, but not necessarily, at least one of the two isocyanate groups is directly linked to an aromatic or cycloaliphatic ring. Substances which are suitable and which are preferred as component i) or as part of component i) are aromatic or cycloaliphatic diisocyanates of molecular weight range 174 to 300, such as 4,4'-diphenylmethane diisocyanate, optionally in admixture with 2,4'-diphenylmethane diisocyanate, 2,4-diisocyanatotoluene and industrial mixtures thereof with preferably up to 35% by weight, with respect to the mixture, of 2,6-diisocyanatotoluene, 1-isocyanato-3,3,5-trimethyl-5-isocyanatomethylcyclohexane (IPDI), bis-(4-isocyanatocyclohexyl)methane, 1-isocyanato-1-methyl-4(3)-isocyanato-methyl-cyclohexane, and 1,3-diisocyanato-6-methyl-cyclohexane, optionally in admixture with 1,3-diisocyanato-2-methlylcyclohexane. Mixtures of the aforementioned isocyanates can also of course be used.

1-isocyanato-3,3,5-trimethyl-5-isocyanatomethylcyclohexane (IPDI) and/or 2,4-diisocyanatotoluene and industrial mixtures thereof with preferably up to 35% by weight, with respect to the mixture, of 2,6-diisocyanatotoluene, are preferably used as component i).

For the production of polyurethane prepolymer A), diisocyanate component i) is reacted with a polyol component ii). Polyol component ii) contains, as its main component, a polyoxyalkylene diol which has a molecular weight from 3000 to 20,000 (corresponding to an OH number from 37.3 to 5.6), preferably 4000 to 15,000 (corresponding to an OH number from 28 to 7.5). The polyoxyalkylene diols which are preferably used according to the invention are those of the type known in the art from polyurethane chemistry such as those which can be produced by the ethoxylation and/or propoxylation of suitable starter molecules. Examples of suitable starter molecules include diols such as ethylene glycol, propylene glycol, 1,3-butanediol, 1,4-butanediol, 1,6 hexanediol, 2-ethylhexanediol-1,3, and also include primary monoamines such as aliphatic amines, e.g. ethylamine or butylamine. The polyoxyalkylene diols which are preferably used have an average molecular weight, as calculated from their OH content and functionality, from 3000 to 20,000, preferably 4000 to 15,000, and have a maximum ethylene oxide content of 20% by weight with respect to the total weight of the polyoxyalkylene diol.

The substances which are quite particularly preferred as component ii) are polypropylene oxide polyethers with a maximum total degree of unsaturation of 0.04 milliequivalents/g and an average molecular weight, as calculated from their OH content and functionality, of 8000 to 12,000.

The polyether polyols with a low degree of unsaturation which are most preferably used according to the invention are known in principle and are described, for example, in EP-A 283 148, U.S. Pat. Nos. 3,278,457, 3,427,256, 3,829, 505, 4,472,560, 3,278,458, 3,427,334, 3,941,849, 4,721,818. 3,278,459, 3,427,335 and 4,355,188.

The polyether polyols which can be used according to the invention have a low degree of unsaturation and are preferably produced using metal cyanides as catalysts. The fact that the polyether polyols with a low degree of unsaturation which are most preferably used can be employed particularly advantageously for the production of flexible, low-modulus sealing materials must be said to be extremely surprising, since according to the prior art polyurethanes which are more ripid and which have a higher modulus are produced by the use of polyols of this type.

During the production of NCO prepolymers A), subsidiary amounts of low molecular weight dihydric and trihydric alcohols of molecular weight 32 to 500 can optionally be used in conjunction. Suitable examples include ethylene glycol, 1,3-butandiol, 1,4-butanediol, 1,6-hexandiol, glycerine or trimeethylolpropane. The use in conjunction of low molecular weight alcohols is by no means preferred, however.

Moreover, during the production of NCO prepolymers A) subsidiary amounts of prior art polyfunctional polyether polyols can also be used in conjunction, although this is also by no means preferred.

Production of the polyurethane prepolymers which can be used according to the invention as component A) is effected by the reaction of diisocyanate component i) with diol component ii) within the temperature range from 40 to 120° C., preferably 50 to 100° C. whilst maintaining an NCO/OH equivalent ratio from 1.2:1 to 1.8:1, preferably from 1.3:1 to 1.6:1. During the production of these polyurethane prepolymers, the amine or organometallic catalysts which are known in the art from polyurethane chemistry can optionally be used in conjunction.

The polyurethane prepolymers A) which can be used according to the invention have an NCO content from 0.21 to 0.56%. preferably from 0.28 to 0.42%, corresponding to an average molecular weight from 15,000 to 50,000, preferably from 20,000 to 40,000.

In the second stage of the method according to the invention, the polyurethane prepolymers A) which can be used according to the invention are reacted with compounds of formula (I)

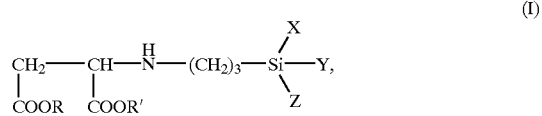

wherein

R and R' represent identical or different alkyl radicals comprising 1 to 8 carbon atoms, preferably 1 to 4 carbon atoms, most preferably 1 to 2 carbon atoms. and X, Y, Z represent identical or different alkyl or alkoxy radicals comprising 1 to 4 carbon atoms, with the proviso that at least one of the radicals represents, and preferably all 3 radicals represent, a $C_1$–$C_8$ alkoxy group.

Production of the compounds comprising alkoxysilane and amino groups which can be used according to the invention is effected as described EP-A 596 360, by the reaction of aminoalkyl alkoxysilanes of formula (II)

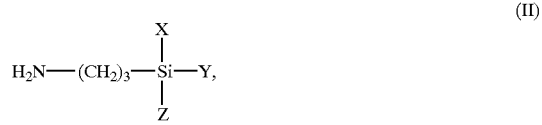

wherein

X, Y and Z have the meanings given for formula (I), with esters of maleic and/or fumaric acids, of formula (III)

wherein

R and R, independently of each other, represent a $C_1$–$C_8$ alkyl.

Examples of suitable aminoalkyl alkoxysilanes of formula (II) include 3-aminopropyl-trimethoxysilane, 3-aminopropyltriethoxysilane and 3-aminopropyl-methyl-diethoxysilane; 3-aminopropyltrimethoxysilane and 3-aminopropyltriethoxysilane are particularly preferred.

In the method according to the invention, the reaction of the NCO prepolymers with compounds of formula (I) which comprise alkoxysilane and amino groups is conducted within a temperature range from 0 to 150° C., preferably 20–80° C., wherein the quantitative ratios are generally selected so that 0.95 to 1.1 moles of aminosilyl compound are used per mole of NCO groups used, 1 mole of aminosilyl compound is preferably used per mole of NCO groups used. When higher reaction temperatures are employed, a cyclo-condensation reaction can occur in accordance with the teaching of EP-A 807 649. However, this is by no means troublesome and from time to time can even be advantageous.

The present invention further relates to the use of the polyurethane prepolymers comprising alkoxysilane terminal groups according to the invention as binders for the production of isocyanate-free, low-modulus polyurethane sealing materials, preferably for the building sector. These sealing materials crosslink under the action of atmospheric moisture, via a silane condensation polymerisation reaction.

For the production of sealing materials such as these, the polyurethane prepolymers comprising alkoxysilane terminal groups according to the invention can also be formulated together with customary plasticisers, fillers, pigments, drying agents, additives, light stabilisers, antioxidants. thixotropic agents, catalysts or bonding agents, and optionally with other adjuvant substances and additives, according to known methods for the production of sealing materials.

Examples of suitable fillers include carbon black, precipitated hydrated silicas, mineral chalk materials and precipitated chalk materials. Examples of suitable plasticisers include phthalic acid esters, adipic acid esters, alkylsulphonic acid esters of phenol, or phosphoric acid esters.

Examples of thixotropic agents include pyrogenic hydrated silicas, polyamides, products derived from hydrogenated castor oil, and also polyvinyl chloride.

Organotin compounds and amine catalysts can be cited as suitable catalysts for the curing reaction.

Examples of organotin compounds include: dibutyltin diacetate, dibutyltin dilaurate, dibutyltin bis-acetoacetonate and tin carboxylates, such as tin octoate for example. The aforementioned tin catalysts can optionally be used in combination with amine catalysts such as aminosilanes or diazabicyclooctane.

Drying agents which are particularly suitable include alkoxysilyl compounds such as vinyl trimethoxysilane, methyl trimethoxysilane, i-butyl trimethoxysilane and hexadecyl trimethoxysilane.

The known functional silanes are used as such as bonding agents, such as aminosilanes of the aforementioned type, for example, and also aminoethyl-3-aminopropyl-trimethoxt- and/or N-aminoethyl-3-aminopropyl-methyl-dimethoxysilane. epoxysilanes and/or mercaptosilanes.

The crosslinked polymers are distinguished by their outstanding extensibility and at the same time by their low modulus. In particular, products based on the polyoxypropylene glycols with a low total degree of unsaturation which are preferably used as diol component ii) are distinguished by their low modulus, excellent mechanical properties and by their low degree of surface tack.

EXAMPLES

Example 1

4000 g of a polypropylene glycol with an OH number of 14 and with a degree of unsaturation of 0.005 milliequivalent/g (Acclaim 8200; manufactured by Arco) were pre-polymerised with 166.5 g isophorone diisocyanate at 100° C. until the theoretical NCO content of 0.5% was reached. The polyurethane prepolymer obtained had a calculated average molecular weight of 16,600. After cooling the batch to 60° C., 175.5 g N-(3-trimethoxysilylpropyl) aspartic acid diethyl ester (prepared according to EP-A 596 360, Example 5) were rapidly added drop-wise thereto, and the mixture was stirred until isocyanate bands were no longer observed in the IR spectrum. The polyurethane prepolymer comprising alkoxysilyl terminal groups which was obtained had a viscosity of 26,000 mPas (23° C.).

A film which was cast on to a glass plate cured overnight, using dibutyltin diacetate as a catalyst, to form a clear, highly flexible plastic with a Shore A hardness of 13.

Example 2

2000 g of a polyether diol with an OH number of 28, which was produced by the propoxylation of propylene glycol and subsequent ethoxylation of the propoxylation product (PO/EO ratio 80:20), were pre-polymerised with 104.4 g toluene 2,4-diisocyanate at 80° C. until the theoretical NCO content of 0.6% was reached. The polyurethane prepolymer obtained had a calculated average molecular weight of 21,000. Alter cooling the batch to 60° C. 64.6 g N-(3-trimethoxysilyl-propyl)aspartic acid dimethyl ester (prepared according to EP-A 596 360, Example 4) were rapidly added drop-wise thereto until isocyanate bands were no longer observed in the IR spectrum. The polyurethane prepolymer comprising alkoxysilyl terminal groups which was obtained had a viscosity of 96,000 mPas (23° C.).

A film which was cast on to a glass plate cured overnight, using dibutyltin diacetate as a catalyst, to form a clear, highly flexible plastic with a Shore A hardness of 9.

Example 3

4000 g of a polypropylene glycol with an OH number of 14 and with a degree of unsaturation of 0.005 milliequivalent/g (Acclaim 8200, manufactured by Arco) were pre-polymerised with 155.4 g isophorone diisocyanate at 100° C. until the theoretical NCO content of 0.4% was reached. The polyurethane prepolymer obtained had a calculated average molecular weight of 21,000. After cooling the batch to 60° C. 140.4 g N-(3-trimethioxysilylpropyl) aspartic acid diethyl ester (prepared according to EP-A 596 360, Example 5) were rapidly added drop-wise thereto, and the mixture was stirred until isocyanate bands were no longer observed in the IR spectrum. The polyurethane prepolymer comprising alkoxysilyl terminal groups which was obtained had a viscosity of 28,000 mPas (23° C.).

A film which was cast on to a glass plate cured overnight, using dibutyltin diacetate as a catalyst, to form a flexible plastic with a Shore A hardness of 15.

Example 4

5300 g of a polypropylene glycol with an OH number of 10.6 and with a degree of unsaturation of 0.005 milliequivalent/g (Acclaim 12200, manufactured by Arco) were pre-polymerised with 147.9 g of a commercial mixture containing 80% by weight toluene 2,4-diisocyanate and 20% by weight toluene 2,6-diisocyanate at 80° C. until the theoretical NCO content of 0.54% was reached. The polyurethane prepolymer obtained had a calculated average molecular weight of 15,500. After cooling the batch to 60° C., 226.1 g N-(3-trimethoxysilylpropyl)aspartic acid dimethyl ester (prepared according to EP-A 596 360, Example 4) were rapidly added drop-wise thereto, and the mixture was stirred until isocyanate bands were no longer observed in the IR spectrum. The polyurethane prepolymer comprising alkoxysilyl terminal groups which was obtained had a viscosity of 25,000 mPas (23° C.).

A film which was cast on to a glass plate cured overnight, using dibutyltin diacetate as a catalyst, to form a flexible plastic with a Shore A hardness of 12.

Example 5

5300 g of a polypropylene glycol with an OH number of 10.6 and with a degree of unsaturation of 0.005 milliequivalent/g (Acclaim 12200; manufactured by Arco) were pre-polymerised with 166.5 g of isophorone diisocyanate at 100° C. until the theoretical NCO content of 0.38% was reached. The polyurethane prepolymer obtained had a calculated average molecular weight of 22,000. After cooling the batch to 60° C., 175.5 g N-(3-trimethoxysilylpropyl) aspartic acid diethyl ester (prepared according to EP-A 596 360, Example 5) were rapidly added drop-wise thereto, and the mixture was stirred until isocyanate bands were no longer observed in the IR spectrum. The polyurethane prepolymer comprising alkoxysilyl terminal groups which was obtained had a viscosity of 30,000 mpas (23° C.).

A film which was cast on to a glass plate cured overnight, using dibutyltin diacetate as a catalyst, to form a flexible plastic with a Shore A hardness of 12.

Example 6

Production of an Isocyanate-free Polyurethane Sealing Material

The following components were processed in a commercially available planetary mixer to produce a ready-to-use sealing material:

| | |
|---|---|
| 41.6 parts by weight | of the prepolymer from Example 3 |
| 14.6 parts by weight | diiso-undecyl phthalate (plasticiser) |
| 0.20 parts by weight | dibutyltin bis-acetoacetonate (10% solution in solvent naphtha 100) |
| 1.50 parts by weight | vinyl trimethoxysilane |
| 41.6 parts by weight | precipitated chalk (Type: Socal U1S2). |

The mixture was dispersed for 10 minutes at a pressure of 100 mbar, whereupon the internal temperature rose to 60° C.

0.5 parts by weight N-aminoethyl-3-aminopropyl-methyldimethoxysilane were subsequently added and were incorporated by stirring for 10 minutes at a pressure of 100 mbar.

The sealing material which was thus produced exhibited excellent stability, adhered to almost all substrates, and cured with a skin formation time of about 1.5 hours.

What is claimed is:

1. A polyurethane prepolymer having alkoxysilane terminal groups which are produced by the reaction of
    A) a linear polyurethane prepolymer with a number-average molecular weight from 15,000 to 50,000, as calculated from its NCO content and NCO functionality, produced by the reaction of
        i) an aromatic, aliphatic or cycloaliphatic diisocyanate component having an NCO content of 20% to 60% by weight, with
        ii) a polyol component which comprises a polypropylene oxide polyether diol having a maximum total degree of unsaturation of 0.04 milliequivalents/g and a number average molecular weight from 8000 to 20,000, as calculated from its OH content and functionality, with
    B) a compound of formula (I)

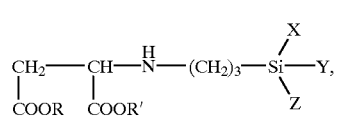

(I)

wherein
    R and R' represent identical or different alkyl radicals comprising 1 to 8 carbon atoms, and
    X, Y, Z represent identical or different alkyl or alkoxy radicals comprising 1 to 4 carbon atoms, with the proviso that at least one of the radicals represents an alkoxy group.

2. The polyurethane prepolymer of claim 1, wherein the polyurethane prepolymer A) has a number average molecular weight from 20,000 to 40,000.

3. The polyurethane prepolymer of claim 1, wherein X, Y and Z, independently of each other, represent methoxy or ethoxy.

4. A sealing material comprising the polyurethane prepolymer of claim 1.

5. The polyurethane prepolymer of claim 1 wherein R and R' represent identical or different alkyl radicals having 1 to 4 carbon atoms.

6. The polyurethane prepolymer of claim 2 wherein R and R' represent identical or different alkyl radicals having 1 to 4 carbon atoms.

7. The polyurethane prepolymer of claim 3 wherein R and R' represent identical or different alkyl radicals having 1 to 4 carbon atoms.

* * * * *